Oct. 16, 1962 H. T. WINCHEL 3,059,177
SENSITIVE HIGH IMPEDANCE DETECTOR
Filed Sept. 29, 1959
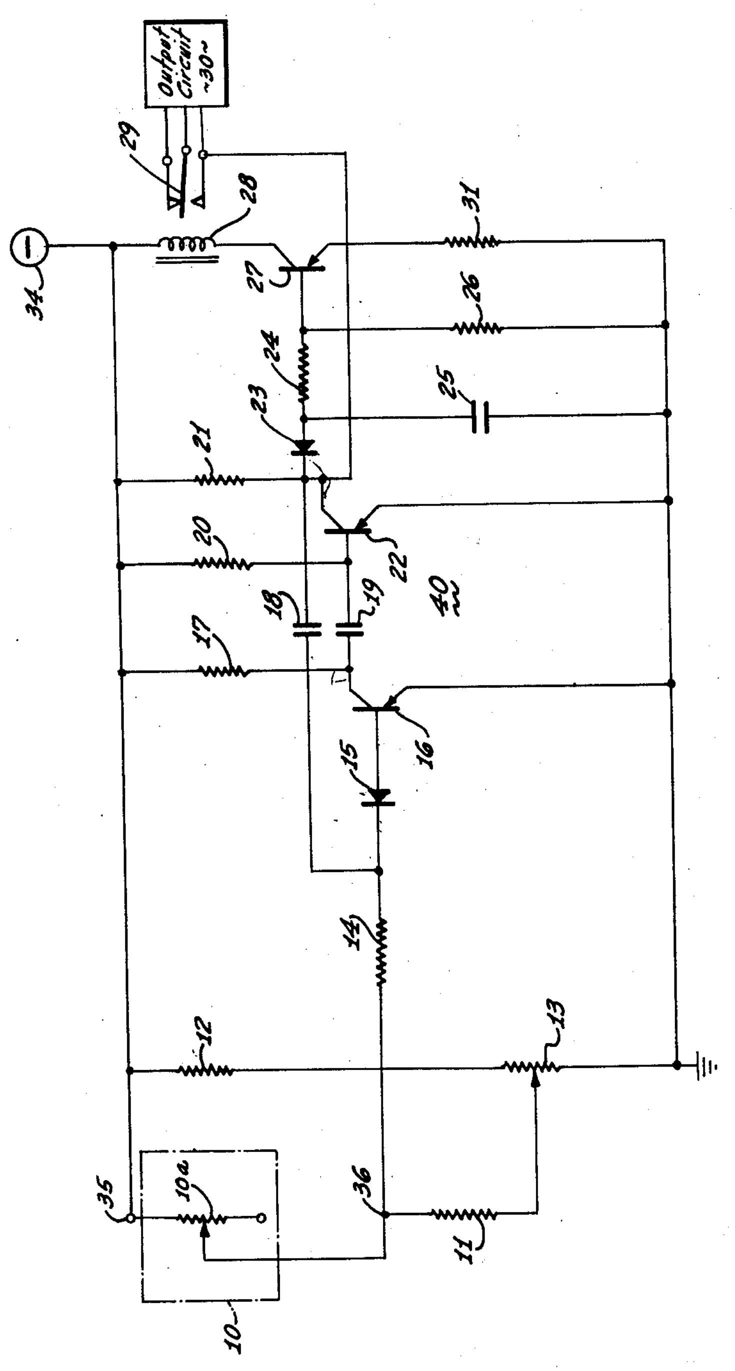
INVENTOR:
Henry T. Winchel
By Smyth & Roston
Attorneys, United States Patent Office 3,059,177

Patented Oct. 16, 1962

3,059,177

SENSITIVE HIGH IMPEDANCE DETECTOR

Henry T. Winchel, Culver City, Calif., assignor to Consolidated Electronics Industries Corp., a corporation of Delaware Filed Sept. 29, 1959, Ser. No. 843,147
5 Claims. (Cl. 324—57)

This invention relates to a sensitive high impedance detector and, more particularly, to a detector of this type which responds to a change of an input impedance condition to provide an indication of the change.

There are many applications in which it is required to monitor a circuit without introducing an additional load to the circuit being monitored. In some of these applications, it is desirable for the monitoring or detector circuit to present a high impedance for input conditions in a predetermined range. When the magnitude of an input condition changes to a predetermined threshold value, the detector responds to provide an indication of the change.

In a specific illustrative embodiment of this invention, the input condition is a varying impedance of an input circuit arrangement. When the impedance of the input circuit arrangement presented to the detector circuit is larger than a predetermined value, the detector circuit remains in its normal condition and presents a high impedance to the input circuit arrangement. When the impedance of the input circuit arrangement decreases below the predetermined threshold value, the detector circuit is energized to provide an output indication. The output indication is provided only if the impedance of the input arrangement remains below the threshold value for a predetermined duration.

The detector circuit includes a multivibrator having a first and second operative condition which is coupled by an asymmetrically conducting impedance element to the input circuit arrangement being monitored. The impedance element functions as a sensitive gate to maintain the multivibrator in one of its conditions as long as the impedance presented b ythe input circuit arrangement does not decrease below the threshold value. When the impedance presented by the input circuit arrangement decreases below the threshold value, the multivibrator oscillates.

When the multivibrator is oscillating, the input arrangement is included as part of the timing circuitry of the multivibrator, with the oscillation frequency varying inversely with the magnitude of the input impedance. The frequency of the multivibrator, which continues to oscillate as long as the impedance of the input arrangement is below the threshold value, is therefore an indication of the magnitude of the input impedance. In this manner, the asymmetrically conducting impedance element functions to establish a sensitive detection means for changes in input impedance in the vicinity of the threshold value. The initiation of oscillation provides an accurate determination of the threshold value, and the multivibrator frequency provides a measure of the magnitude of the input impedance for impedances smaller than the threshold value.

Further features of this invention relates to the provision of means for providing an output indication a predetermined interval after the impedance of the input arrangement changes to a value smaller than the threshold value. The duration of the predetermined interval is determined by a capacitive arrangement including another asymmetrically conducting impedance element which is coupled to the multivibrator. The duration of the predetermined interval is independent of the frequency of the multivibrator.

Further features and advantages of this invention will become apparent upon consideration of the following description when read in conjunction with the drawing wherein the single FIGURE is a circuit representation of the high impedance detector circuit of this invention.

As shown in the single figure, a variable impedance input arrangement 10 is connected by a resistor 14 to the cathode of a diode 15. The input arrangement is depicted in the form of a rheostat 10*a* but any variable impedance circuit may be monitored by the detector circuit of this invention. The diode 15 functions as a sensitive gate to maintain a PNP junction transistor 16 nonconductive for impedances of the arrangement 10 which exceed a predetermined threshold value. Illustratively, the transistor 16 remains non-conductive for impedances of the arrangement 10 which exceed 2,000 megohms. When the impedance of the arrangement 10 decreases to a value less than 2,000 megohms, the diode 15 becomes sufficiently forward biased to establish conduction through the transistor 16.

One terminal 35 of the input impedance arrangement 10 is connected to a negative potential source 34, which may be a negative 30 volt battery, and the other terminal 36 is connected by a resistor 11 to the adjustable tap of a potentiometer 13. The resistor 11 may have a suitable value such as 0.5 megohm and the potentiometer 13 may have a suitable resistance between its end terminals of 500 ohms. One end terminal of the potentiometer 13 is connected to a ground connection and the other end terminal is connected through a resistor 12 to the negative potential source 34. The resistor 12 may have a resistance of 30 kilohms which is considerably larger than the resistance of the potentiometer 13.

The potential at the terminal 36 of the input arrangement 10 will accordingly only be slightly negative due to the voltage divider effect of the resistor 12 and the potentiometer 13. The impedance of the input arrangement 10 is in the vicinity of 200 megohms whereas the resistance of the resistor 11 is only 0.5 megohm and the potentiometer presents a maximum resistance to ground of 500 ohms. As will be apparent from the following description, a very small change of the potential at the terminal 36 may change the conducting condition of the diode 15.

In order for the diode 15 to become conductive, a predetermined forward biasing potential illustratively of approximately 0.3 volt between the anode and its cathode is required. The potentiometer 13 is adjusted so that the 0.3 volt forward biasing potential is provided across the diode 15 when the impedance across the input circuit arrangement 10 is 2,000 megohms. The anode of the diode 15 is directly connected to the base electrode of the junction transistor 16. The emitter electrode of the transistor 16 is connected to the ground connection, and its collector electrode is connected by a resistor 17 to the source 34. The collector resistor 17 may, illustratively, have a resistance of 10 kilohms.

The potential at the emitter electrode of the transistor 16 is slightly more positive than the potential at the cathode of the diode 15 due to the voltage divider effect of the serially connected resistor 11 with the input arrangement 10 between the ground connection and the negative potential source 34. A small leakage current, therefore, flows from the ground connection through the emitter electrode of the transistor 16, the emitter-to-base junction of the transistor 16 and through the diode 15. From the diode 15, the leakage current passes through the resistor 14 to a parallel circuit arrangement including the input arrangement 10 as one branch, and the resistor 11, the upper portion of the potentiometer 13 and the resistor 12 as a second branch. The current through the two branches passes to the source 34. Most of the current is through the second branch because of the relatively high impedance of the input circuit arrangement 10. The leakage current through the transistor 16 and the diode 15, however, is insufficient to forward bias the diode 15. For impedance values of the input circuit arrangement in excess of 2,000 megohms, the potential at the terminal 36 is sufficiently positive to maintain the diode 15 insufficiently forward biased end, therefore, in its high impedance condition. The base electrode of the transistor 16 cannot, therefore, become sufficiently negative with respect to its emitter electrode in order to cause the transistor 16 to become conductive.

The transistor 16 is part of a multivibrator 40 which includes another PNP junction transistor 22. The collector electrode of the transistor 16 is coupled by a capacitor 19 to the base electrode of the transistor 22 which is connected by a base resistor 20 to the negative potential source 34. The capacitor 19 may have a suitable value such as 0.01 microfarad, and the resistor 20 may have a suitable value such as 30 megohms. As long as the diode 15 remains in its high impedance condition, the transistor 16 is non-conductive and the transistor 22 is conductive. The emitter electrode of the transistor 22 is connected to the ground connection, and its collector electrode is connected by a resistor 21 to the source 34. The resistor 21 may have a suitable resistance such as 10 kilohms. The transistor 22 is conductive because its emitter electrode is positively biased with respect to its base electrode. The potential at its collector electrode is, therefore, substantially at the potential of the ground connection due to the low impedance presented by the transistor 22 when it is conductive.

The relatively positive potential at the collector electrode of the transistor 22 maintains a diode 23 in its high impedance condition. The cathode of the diode 23 is directly connected to the collector electrode of the transistor 22, and its anode is connected by two serially connected resistors 24 and 26 to the ground connection. The resistors 24 and 26 may have suitable resistances such as 5 kilohms each. The potential at the collector electrode of the transistor 22 is slightly negative with respect to the ground potential due to the small potential drop across the conducting transistor 22, but insufficiently negative to forward bias the diode 23 to its low impedance condition. Less than 0.3 volt appears across the diode 23 when the transistor 22 is conducting. The junction between the resistors 24 and 26 is connected to the base electrode of a third PNP junction transistor 27 in the detector circuit. The transistor 27 remains non-conductive as long as the diode 23 is in its high impedance condition.

When the input impedance presented by the arrangement 10 decreases below the threshold value of 2,000 megohms, the potential at terminal 36 becomes sufficiently negative to switch the diode 15 to its low impedance condition and trigger the multivibrator 40. When the multivibrator 40 is triggered, the transistor 16 becomes conductive, and couples a positive pulse from its collector electrode through the coupling capacitor 19 to the base electrode of the transistor 22. A positive pulse is developed at the collector electrode because of the surge of current through the collector resistor 17 when the impedance from the emitter to collector electrodes of the transistor 16 is reduced. The impedance of the emitter to collector junction decreases when the base electrode becomes sufficiently negative to forward bias the emitter-to-base junction.

The positive pulse at the base electrode of the transistor 22 reverse biases the emitter-to-base junction of the transistor 22 causing it to become non-conductive. When the transistor 22 becomes non-conductive, it develops a negative pulse at its collector electrode due to the cessation of current through the resistor 21 and couples the negative pulse through a feedback capacitor 18 to the cathode of the diode 15. The feedback capacitor 18 may have a suitable capacitance such as 0.002 microfarad. The feedback potential is a positive feedback potential because it aids the change of potential at the cathode of the diode 15 to increase the conduction through the transistor 16. The positive feedback potential, in this manner, provides for a regenerative action to establish an oscillatory operation with the transistors 16 and 22 becoming alternatively conductive and non-conductive.

When the pulses through the respective capacitors 19 and 18 terminate after the transistor 22 has become non-conductive, the transistor 22 again becomes conductive to provide a positive pulse to the cathode of the diode 15 to reverse-bias the diode 15 and return the transistor 16 to its original condition. The oscillatory operation continues in this manner as long as the impedance presented by the input arrangement 10 is less than the threshold value of 2,000 megohms.

Each time that the transistor 22 becomes non-conductive, its collector potential decreases to forward bias the diode 23. When the diode 23 becomes forward biased, it charges a timing capacitor 25 having one terminal connected to the anode of the diode 23 and the other terminal to the ground connection. The capacitor 25 may have a suitable capacitance such as 0.1 microfarad. As the capacitor 25 charges, it controls the potential at the junction between the two resistors 24 and 26. As described above, the resistors 24 and 26 are connected to the base electrode of the PNP junction transistor 27. The emitter electrode of the transistor 27 is connected by an emitter resistor 31 to the ground connection, and its collector electrode is connected to an output indicator which is shown in the form of a relay winding 28. The relay winding 28 is connected between the source 34 and the collector electrode of the transistor 27. The emitter resistor 31 may have a suitable value such as 50 ohms, and the relay winding 28 may be of a fast action sensitive relay. When the diode 23 becomes forward biased, it permits the potential at the base electrode to decrease under the timing control of the capacitor 25. When the potential at the base electrode becomes sufficiently negative, the transistor 27 becomes sufficiently conductive to energize the relay winding 28. The relay winding 28 is coupled to a switch 29 which, when operated, opens a path between its movable arm and an upper contact, and closes a path between its movable arm and a lower contact to form an operative connection to an output circuit 30.

The relay winding 28 remains operated as long as the multivibrator 40 continues to oscillate. For an input impedance slightly less than 2,000 megohms, the oscillating frequency of the multivibrator 40 may, illustratively, be 4,000 cycles per second. The discharge time constant of the capacitor 25 is longer than its charging time constant so that it attains a potential sufficient to operate the relay winding 28 and maintains the potential as the transistor 22 becomes alternatively conductive and non-conductive. The transistor 27 may not be sufficiently conductive to operate the relay winding 28 until after a predetermined number of oscillations of the multivibrator 40. The negative potential across the capacitor 25 increases step by step during each oscillation of the multivibrator 40 until sufficient current is provided through the transistor 27 to operate the relay winding 28.

The frequency of oscillation of the multivibrator 40 is determined in part by the magnitude of the input impedance presented by the circuit arrangement 10. As the input impedance is decreased from 2,000 megohms, the biasing potential at the cathode of the diode 15 becomes more negative so that shorter duration feedback voltages through the capacitor 18 are necessary to maintain the oscillation. The frequency of the oscillation, therefore, increases as the input impedance presented by the circuit arrangement 10 decreases. The collector electrode of the transistor 22 is connected to the lower contact of the switch 29 so that an alternating signal is introduced to the output circuit when the switch 29 is operated. The frequency of the multivibrator 40 is, in this manner, a measure of the impedance of the input arrangement 10 for impedances which are less than the threshold value of 2,000 megohms.

Though the oscillating frequency of the multivibrator 40 is higher for smaller input impedances, the timing interval provided for operating the relay winding 28 to provide an output indication remains substantially the same. For higher frequencies, the capacitor 25 is charged by a smaller amount during each cycle but its rate of increase over a number of oscillations with time remains substantially the same.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. A high impedance detector circuit for monitoring a variable impedance circuit having a value in the order of thousands of megohms, including, regenerative amplifier means, a first asymmetrically conducting impedance element coupled to the variable impedance circuit and to the regenerative amplifier means for inhibiting the regenerative operation of said regenerative amplifier means for impedance values of the variable impedance circuit in a predetermined range of impedance values, means connected in series with said first asymmetrically conducting impedance element and in parallel with the variable impedance circuit and responsive to the impedance value of said variable impedance circuit for producing a relatively low flow of the same current through the first asymmetrically conducting impedance element and the regenerative amplifier means to reverse bias the first asymmetrically conducting impedance element in the predetermined range of impedance values for the variable impedance circuit, means having first and second terminals and commonly coupled electrically at the first terminal to said first asymmetrically conducting impedance element and to the variable impedance circuit and responsive to the impedance value of said variable impedance circuit for forward biasing said asymmetrically conducting impedance element by a predetermined biasing potential when the impedance of the variable impedance circuit changes to an impedance value not in the predetermined range of impedance values whereby said first asymmetrically conducting impedance element permits the operation of said regenerative amplifier means, a timing circuit arrangement coupled to and controlled by said regenerative amplifier means and including a normally reverse-biased asymmetrically conducting impedance element which is forward-biased by said regenerative amplifier means when said regenerative amplifier means is operated, means including a capacitive means coupled to said element of said timing arrangement for developing a predetermined control potential after a predetermined interval following the change of impedance of the variable impedance circuit to a value not in the predetermined range, and an output device coupled to said capacitive means and responsive to the predetermined control potential for providing an output indication.

2. The detector circuit set forth in claim 1 in which the reverse biasing means for the first asymmetrically conducting impedance element constitutes an impedance circuit having a relatively low value and in which this impedance circuit is coupled to the variable impedance circuit and to the regenerative amplifier means and is connected across the variable impedance circuit and in series with the asymmetrically conducting impedance element to produce the same current of relatively low magnitude through the regenerative amplifier means and the first asymmetrically conducting impedance element for reverse biasing the element.

3. The detector circuit set forth in claim 2 in which the regenerative amplifier means comprises a multivibrator constructed to produce rectangular signals when operated.

4. A high impedance detector circuit for monitoring a variable impedance circuit having a value in the order of thousands of megohms, including, regenerative amplifier means, an asymmetrically conducting impedance element, a control circuit having a relatively low impedance value and connected in a series circuit with the regenerative amplifier means and with the asymmetrically conducting impedance element and connected across the variable impedance circuit for producing the same current of relatively low magnitude through the regenerative amplifier means and the asymmetrically conducting impedance element to reverse bias the asymmetrically conducting impedance element for inhibiting the regenerative operation of said regenerative amplifier means for impedance values of the variable impedance circuit in a particular range of impedance values, and means having first and second terminals and coupled electrically at the first terminal to said asymmetrically conducting impedance element and to the variable impedance circuit for forward biasing said asymmetrically conducting impedance element by a predetermined biasing potential when the impedance of the variable impedance circuit changes to an impedance value not in the particular range of impedance values whereby said asymmetrically conducting impedance element permits the operation of said regenerative amplifier means and also couples the variable impedance circuit to said regenerative amplifier means to control the frequency of oscillation of the regenerative amplifier means in accordance with the impedance value of the variable impedance circuit.

5. A high impedance detector circuit in accordance with claim 4 including in addition, a timing circuit arrangement coupled to and controlled by said regenerative amplifier means and including a normally reverse-biased asymmetrically conducting impedance element which is forward-biased by said regenerative amplifier means when said regenerative amplifier means is operated, means including capacitive means coupled to said element of said timing arrangement for developing a predetermined control potential a particular interval after the operation of said regenerative amplifier means, and an output device coupled to said capacitive means and responsive to the predetermined control potential for providing an output indication.

References Cited in the file of this patent

UNITED STATES PATENTS

| | | |
|---|---|---|
| 2,598,516 | Dickson | May 27, 1952 |
| 2,639,858 | Hayes | May 26, 1953 |
| 2,659,048 | Zabel et al. | Nov. 10, 1953 |
| 2,737,587 | Trousdale | Mar. 6, 1956 |
| 2,852,702 | Pinckaers | Sept. 16, 1958 |
| 2,877,360 | Moore et al. | Mar. 10, 1959 |
| 2,913,599 | Benton | Nov. 17, 1959 |
| 2,933,657 | Maltby et al. | Apr. 19, 1960 |

FOREIGN PATENTS

| | | |
|---|---|---|
| 794,258 | Great Britain | Apr. 30, 1958 |